United States Patent
Baird

(10) Patent No.: US 10,875,265 B2
(45) Date of Patent: Dec. 29, 2020

(54) HYBRID METALLIC/COMPOSITE ARRANGEMENT FOR TORQUE, BENDING, SHEAR, AND AXIAL LOADING

(71) Applicant: GOODRICH CORPORATION, Charlotte, NC (US)

(72) Inventor: Bradley William Baird, Grimsby (CA)

(73) Assignee: Goodrich Corporation, Charlotte, NC (US)

( * ) Notice: Subject to any disclaimer, the term of this patent is extended or adjusted under 35 U.S.C. 154(b) by 174 days.

(21) Appl. No.: 16/245,934

(22) Filed: Jan. 11, 2019

(65) Prior Publication Data

US 2020/0215773 A1   Jul. 9, 2020

Related U.S. Application Data

(60) Provisional application No. 62/789,957, filed on Jan. 8, 2019.

(51) Int. Cl.
*B29C 70/72* (2006.01)
*B32B 3/06* (2006.01)
*B64C 25/00* (2006.01)
*F16C 7/02* (2006.01)

(52) U.S. Cl.
CPC ............ *B29C 70/72* (2013.01); *B32B 3/06* (2013.01); *B64C 25/00* (2013.01); *F16C 7/026* (2013.01)

(58) Field of Classification Search
CPC ... F16L 9/14; E02D 5/62; B29C 70/68; F16C 3/02
USPC ....... 138/143, 139, 137, 141; 72/68, 70, 368
See application file for complete search history.

(56) References Cited

U.S. PATENT DOCUMENTS

| | | | | |
|---|---|---|---|---|
| 4,214,932 A | | 7/1980 | Vanauken | |
| 4,629,218 A | * | 12/1986 | Dubois | E21B 17/20 138/155 |
| 8,245,734 B2 | * | 8/2012 | Jahani | B21C 25/08 138/109 |
| 8,312,750 B2 | * | 11/2012 | Koerner | B21H 1/18 72/88 |
| 8,967,534 B2 | | 3/2015 | Bachmeyer et al. | |
| 2003/0127149 A1 | * | 7/2003 | Ooyauchi | B21C 37/06 138/177 |
| 2005/0067037 A1 | * | 3/2005 | Salama | E21B 17/01 138/143 |
| 2010/0006698 A1 | | 1/2010 | Steinke et al. | |

(Continued)

FOREIGN PATENT DOCUMENTS

| | | |
|---|---|---|
| DE | 3711258 | 10/1987 |
| DE | 102013111837 | 4/2015 |

(Continued)

OTHER PUBLICATIONS

European Patent Office, European Search Report dated May 26, 2020 in Application No. 19216318.6.

*Primary Examiner* — Patrick F Brinson
(74) *Attorney, Agent, or Firm* — Snell & Wilmer L.L.P.

(57) ABSTRACT

A hybrid metallic/composite structural component may comprise a metallic inner tube, a first lobe extending from the metallic inner tube, and a composite outer tube surrounding the metallic inner tube and the lobe, wherein a first end of the metallic inner tube extends from the composite outer tube and a second end of the metallic inner tube extends from the composite outer tube.

11 Claims, 3 Drawing Sheets

(56) References Cited

U.S. PATENT DOCUMENTS

2015/0159387 A1 6/2015 Chou et al.
2017/0369157 A1 12/2017 Gurvich et al.

FOREIGN PATENT DOCUMENTS

EP 2465665 6/2012
GB 2473007 3/2011

\* cited by examiner

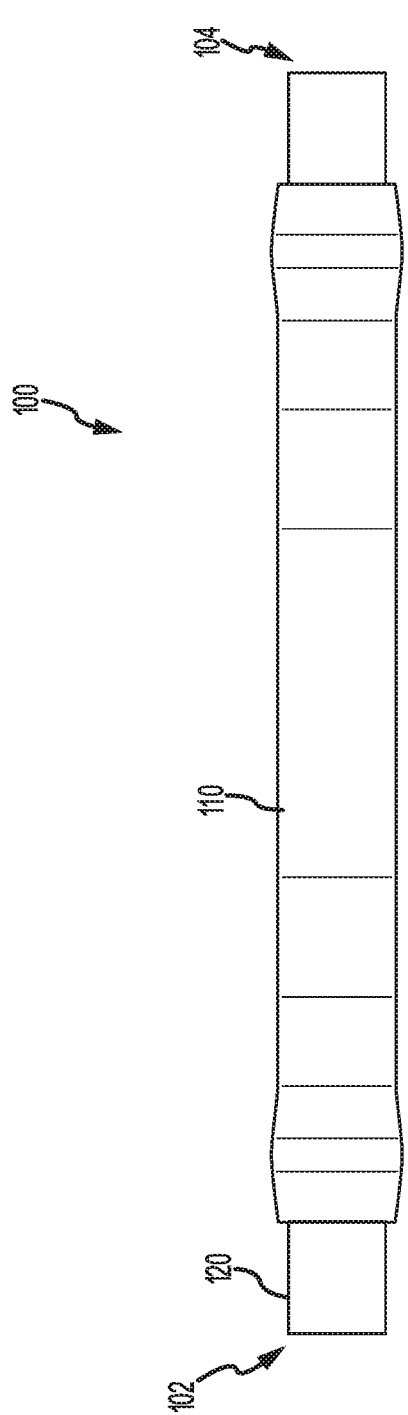
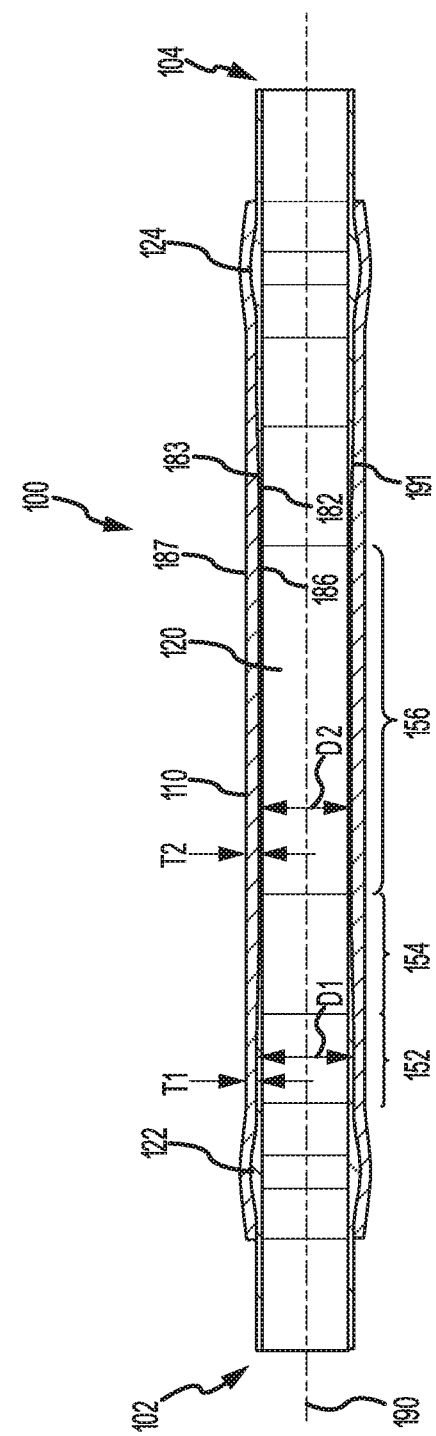

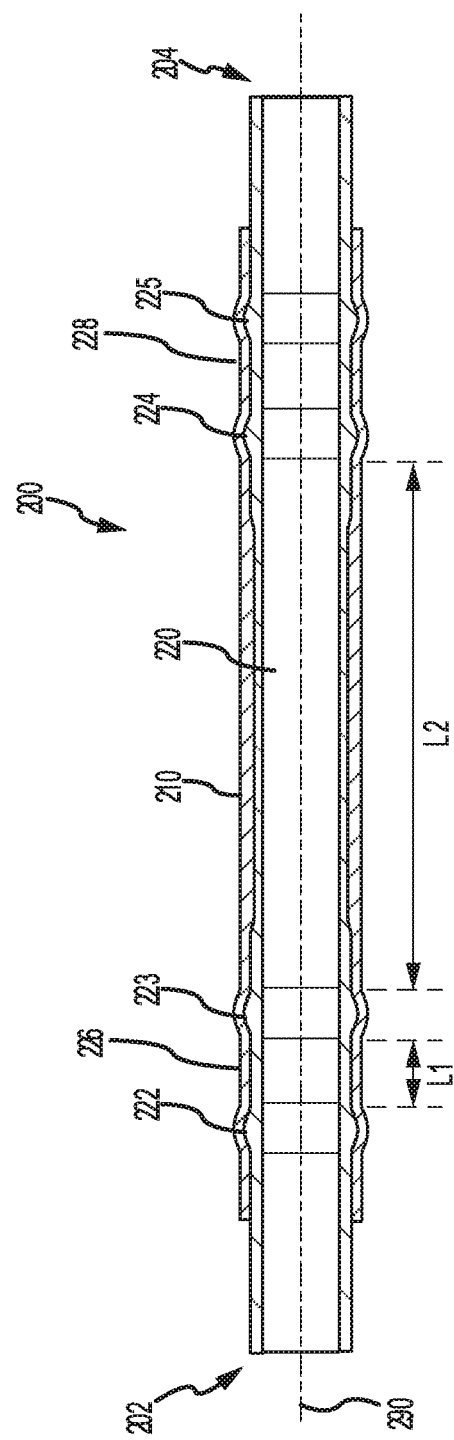

US 10,875,265 B2

HYBRID METALLIC/COMPOSITE ARRANGEMENT FOR TORQUE, BENDING, SHEAR, AND AXIAL LOADING

CROSS REFERENCE TO RELATED APPLICATIONS

This application claims priority to, and the benefit of, U.S. Provisional Patent Application Ser. No. 62/789,957 entitled "HYBRID METALLIC/COMPOSITE ARRANGEMENT FOR TORQUE, BENDING, SHEAR, AND AXIAL LOADING," filed on Jan. 8, 2019. The '957 Application is hereby incorporated by reference in its entirety for all purposes.

FIELD

The present disclosure relates generally to joints, and more specifically to joints having composite components.

BACKGROUND

Conventional structural components, for example aircraft landing gear components, are typically made of metallic materials. These metallic components can be relatively heavy and costly. Substitution of metals with composites is one way to reduce the weight and cost of structural components. Among other challenges is implementation of strong joints for load transfer from composite elements to metallic parts. The composite elements are typically fabricated in the form of tubes and are capable of handling significant axial and bending loads under both tension and compression.

SUMMARY

A structural component is disclosed, comprising a metallic inner tube, a first lobe extending from the metallic inner tube, and a composite outer tube surrounding the metallic inner tube and the first lobe, wherein a first end of the metallic inner tube extends from the composite outer tube and a second end of the metallic inner tube extends from the composite outer tube.

In various embodiments, the metallic inner tube, the first lobe, and the composite outer tube are concentric.

In various embodiments, the first lobe mechanically locks the composite outer tube to the metallic inner tube.

In various embodiments, the structural component further comprises a second lobe extending from the metallic inner tube.

In various embodiments, the first lobe is disposed at the first end of the metallic inner tube and the second lobe is disposed at the second end of the metallic inner tube.

In various embodiments, the metallic inner tube and the first lobe are comprised of a single piece of metal.

In various embodiments, the metallic inner tube comprises a first constant diameter portion, a tapered portion, and a second constant diameter portion.

In various embodiments, an outer diameter of the first constant diameter portion is greater than an outer diameter of the second constant diameter portion.

In various embodiments, the composite outer tube comprises a first wall thickness and a second wall thickness, the first wall thickness is less than the second wall thickness.

In various embodiments, the first wall thickness corresponds to the first constant diameter portion and the second wall thickness corresponds to the second constant diameter portion.

A hybrid metallic/composite arrangement is disclosed, comprising a metallic inner tube, a first lobe extending from the metallic inner tube, a second lobe extending from the metallic inner tube, and a composite outer tube surrounding the metallic inner tube, wherein an inner diameter surface of the composite outer tube conforms to an outer diameter surface of the metallic inner tube, wherein a first end of the metallic inner tube extends from the composite outer tube and a second end of the metallic inner tube extends from the composite outer tube.

In various embodiments, the metallic inner tube, the first lobe, the second lobe, and the composite outer tube are concentric.

In various embodiments, the first lobe and the second lobe mechanically lock the composite outer tube to the metallic inner tube.

In various embodiments, the hybrid metallic/composite arrangement further comprises a third lobe and a fourth lobe extending from the metallic inner tube.

In various embodiments, the metallic inner tube comprises a first constant diameter portion, a tapered portion, and a second constant diameter portion.

In various embodiments, an outer diameter of the first constant diameter portion is greater than an outer diameter of the second constant diameter portion.

In various embodiments, the composite outer tube comprises a first wall thickness and a second wall thickness, the first wall thickness is less than the second wall thickness.

In various embodiments, the first wall thickness corresponds to the first constant diameter portion and the second wall thickness corresponds to the second constant diameter portion.

A method for forming a structural component is disclosed, comprising forming a metallic inner tube comprising at least one lobe, and disposing a composite layer about the metallic inner tube to form a composite outer tube, wherein the composite outer tube surrounds the metallic inner tube and the at least one lobe.

In various embodiments, the composite layer is disposed about the metallic inner tube using at least one of a composite layup process or a fiber-wound fabrication process, and the composite layer comprises a polymer matrix composite reinforced by fibers.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1A illustrates a perspective side view of a hybrid metallic/composite structural component, in accordance with various embodiments;

FIG. 1B illustrates a section view of the hybrid metallic/composite structural component of FIG. 1A, in accordance with various embodiments;

FIG. 2 illustrates a section view of a hybrid metallic/composite structural component, in accordance with various embodiments.

DETAILED DESCRIPTION

Figure 3:
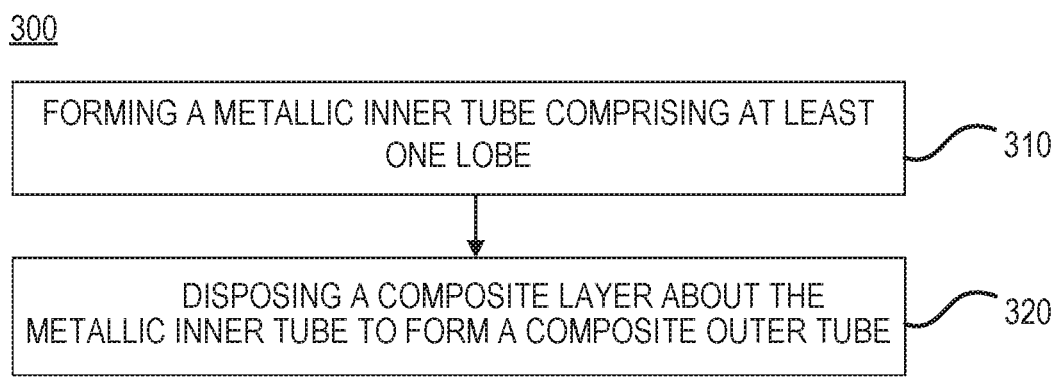
FIG. 3 provides a method for forming a hybrid metallic/composite structural component, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

The present disclosure describes composite components having a metallic inner tube and a composite outer tube formed thereon. A composite may comprise a polymer matrix composite. The composite may comprise a polymer matrix composite reinforced by fibers such as a carbon, glass, organic fibers, or combinations thereof. Such hybrid metallic/composite arrangements may be used in aircraft systems, such as, for example, landing gear systems. However, the systems and methods of the present disclosure may be suitable for use in non-aircraft systems as well.

In various embodiments, a hybrid metallic/composite arrangement of the present disclosure may be useful for various components including, but not limited to, bogie beams, linkages, connecting rods, actuator rods, struts, pistons, trailing arms, structural supports, etc.

A hybrid metallic/composite arrangement of the present disclosure may experience bending loads. The metallic inner tube may have lobes or an undulated surface which may mitigate slipping of the composite outer tube with respect to the metallic inner tube in response to bending loads. In this manner, bending loads may be shared between the composite outer tube and the metallic inner tube.

A hybrid metallic/composite arrangement of the present disclosure may experience axial compression (also referred to herein interchangeably as an axial load) and/or axial tension (also referred to herein interchangeably as an axial load). The metallic inner tube may have lobes or an undulated surface which may mitigate slipping of the composite outer tube with respect to the metallic inner tube in response to the axial loads. Stated differently, the metallic inner tube and the composite outer tube may experience shear loads at the interface of the metallic inner tube and the composite outer tube. Lobes or an undulated surface may be disposed on an outer diameter surface of the metallic inner tube which prevent slippage between the metallic inner tube and the composite outer tube in response to shear loads. In this manner, axial loads (or shear loads) may be shared between the composite outer tube and the metallic inner tube.

A hybrid metallic/composite arrangement of the present disclosure may include a one-piece inner metallic tube which extends through the composite outer tube. Thus, torsion loads may be transferred directly through the one-piece metallic inner tube without relying on bonding and/or friction between metallic and composite components. In this regard, the one-piece metallic inner tube may allow transfer of torque loads, while the one-piece metallic inner tube and the composite outer tube, together, may transfer axial, shear, and bending loads. In various embodiments, the composite outer tube will transfer a greater portion of axial, shear, and bending loads than the one-piece metallic inner tube.

In this regard, a hybrid metallic/composite arrangement of the present disclosure may be optimized for torque, bending, shear, and axial loads.

With reference to FIG. 1A, a perspective view of a structural component 100 is illustrated, in accordance with various embodiments. Structural component 100 may comprise a composite outer tube (also referred to herein as a composite layer) 110 and a metallic inner tube 120. Composite outer tube 110 may comprise a cylindrical geometry. Metallic inner tube 120 may comprise a cylindrical geometry. Composite outer tube 110 may comprise an elliptic geometry. Metallic inner tube 120 may comprise an elliptic geometry. Composite outer tube 110 may be disposed around metallic inner tube 120. Stated differently, composite outer tube 110 may surround metallic inner tube 120.

Metallic inner tube 120 comprises a first end 102 and a second end 104. First end 102 and second end 104 may comprise attachment features configured to structural component 100 to an adjacent component. In various embodiments, first end 102 and a second end 104 may comprise any suitable attachment feature, including a lug, a clevis, a rod, a threaded end, or the like. In various embodiments, first end 102 extends from composite outer tube 110. In various embodiments, second end 104 extends from composite outer tube 110. In various embodiments, structural component 100 is configured to be attached to an adjacent component solely via first end 102 and/or second end 104 of metallic inner tube 120, without attachment to composite outer tube 110.

With combined reference to FIG. 1A and FIG. 1B, metallic inner tube 120 may comprise a plurality of lobes, such as first lobe 122 and second lobe 124. In various embodiments, first lobe 122 and second lobe 124 extend radially (i.e., perpendicular to centerline axis 190) from metallic inner tube 120. In various embodiments, first lobe 122 and second lobe 124 extend radially outward from metallic inner tube 120. In various embodiments, first lobe 122 and second lobe 124 each comprise a convex geometry. First lobe 122 and second lobe 124 may aid in transferring loads (e.g., axial loads, shear loads, and/or bending loads) between composite outer tube 110 and metallic inner tube 120. The geometry of first lobe 122 and second lobe 124 may be configured to provide a mechanical lock to mitigate movement of composite outer tube 110 relative to metallic inner tube 120 along the axial direction (i.e., parallel to centerline axis 190). Stated differently, first lobe 122 and second lobe 124 mechanically lock composite outer tube 110 to metallic inner tube 120. In various embodiments, metallic inner tube 120, first lobe 122, and second lobe 124 are comprised of a single piece of metal.

Metallic inner tube 120 comprises an inner diameter surface 182 and an outer diameter surface 183. In various embodiments, outer diameter surface 183 may be partially defined by first lobe 122 and second lobe 124. Composite outer tube 110 comprises and inner diameter surface 186 and an outer diameter surface 187. The geometry of inner diameter surface 186 of composite outer tube conforms to that of outer diameter surface 183 of metallic inner tube 120.

In various embodiments, metallic inner tube 120 may comprise a first constant diameter portion 152, a tapered portion 154, and a second constant diameter portion 156. First constant diameter portion 152 may be disposed axially inward (to the right of in FIG. 1B) from first lobe 122. Tapered portion 154 may be between first constant diameter portion 152 and second constant diameter portion 156. In various embodiments, second constant diameter portion 156 may define a center portion of metallic inner tube 120. Metallic inner tube 120 may comprise an outer diameter D1 at first constant diameter portion 152. Metallic inner tube 120 may comprise an outer diameter D2 at second constant diameter portion 156. Outer diameter D1 may be greater than outer diameter D2. Tapered portion 154 may define a smooth transition between first constant diameter portion 152 and second constant diameter portion 156.

In various embodiments, the outer diameter of composite outer tube 110 may be constant between first constant diameter portion 152 and second constant diameter portion 156. Thus, the wall thickness T2 of composite outer tube 110 may be greater at second constant diameter portion 156 than the wall thickness T1 of composite outer tube 110 at first constant diameter portion 152. In this regard, wall thickness T1 may correspond to first constant diameter portion 152 and wall thickness T2 may correspond to second constant diameter portion 156. In this manner, the ratio of composite/metallic material along the axis of structural component 100 may vary. In various embodiments, increasing the ratio of composite/metallic material along the axis of structural component 100 may reduce the overall weight of structural component 100.

In various embodiments, the wall thickness of second constant diameter portion 156 is less than the wall thickness of composite outer tube 110. In various embodiments, the wall thickness of first constant diameter portion 152 is less than the wall thickness of composite outer tube 110. In various embodiments, the ratio of wall thickness between metallic inner tube 120 and composite outer tube 110 may be tailored according to a desired load distribution between metallic inner tube 120 and composite outer tube 110.

In various embodiments, metallic inner tube 120 may be cylindrical in geometry. The interface 191 between composite outer tube 110 and metallic inner tube 120 may be generally smooth. In this regard, metallic inner tube 120 may transfer torque loads through structural component 100. In contrast to bending loads and/or axial loads (compressive or tensile), which are shared between metallic inner tube 120 and composite outer tube 110, torque loads may be isolated from composite outer tube 110 since there is no mechanical locking between metallic inner tube 120 and composite outer tube 110 along the hoop direction, in accordance with various embodiments. In this regard, the minimum wall thickness of metallic inner tube 120 may be sized according to predetermined torque load requirements for metallic inner tube 120.

With reference to FIG. 2, a section view of a structural component 200 is illustrated, in accordance with various embodiments. Structural component 200 may comprise a composite outer tube 210 and a metallic inner tube 220. Composite outer tube 210 and metallic inner tube 220 may be concentric. Composite outer tube 210 and metallic inner tube 220 may be coaxial with centerline axis 290.

Structural component 200 may be similar to structural component 100 of FIG. 1B except that structural component 200 comprises four lobes (i.e., lobe 222, lobe 223, lobe 224, and lobe 225). Although illustrated as having four lobes, structural component 200 may have any number of lobes. In various embodiments, lobe 222 and lobe 223 may define an undulated outer surface 226 of composite outer tube 210. In various embodiments, lobe 224 and lobe 225 may define an undulated outer surface 228 of composite outer tube 210. In various embodiments, the distance L1 between lobe 222 and lobe 223 may be less than a fourth of the distance L2 between lobe 223 and lobe 224. In various embodiments, the distance L1 between lobe 222 and lobe 223 may be less than an eighth of the distance L2 between lobe 223 and lobe 224. Increasing the number of lobes 222, 223, 224, 225 extending from metallic inner tube 220 may aid in distributing loads between metallic inner tube 220 and composite outer tube 210.

With reference to FIG. 3, a method 300 for forming a structural component is provided, in accordance with various embodiments. Method 300 includes forming a metallic inner tube comprising at least one lobe (step 310). Method 300 includes disposing a composite layer about a metallic inner tube to form a composite outer tube (step 320).

With combined reference to FIG. 1B and FIG. 3, step 310 may include forming metallic inner tube 120. Step 310 may include forming metallic inner tube 220 (see FIG. 2). Metallic inner tube 120 may be formed using additive manufacturing techniques, negative manufacturing techniques, and/or casting. Step 320 may include disposing a composite layer (e.g., fiber sheets) about a metallic inner tube 120 to form composite outer tube 110. Composite outer tube 110 may be formed using a composite layup process. Metallic inner tube 120 may provide a surface onto which composite outer tube 110 may be formed, during a composite layup process for example. For example, in various embodiments, composite outer tube 110 may be formed by laying composite sheets or layers in a desired shape and bonding the layers together using resins, adhesives, or other bonding agents. In various embodiments, composite outer tube 110 may be formed using a fiber-wound fabrication process, wherein fiber is continuously wound onto metallic inner tube 120 and bonded together using resins, adhesives, or other bonding agents.

In various embodiments, composite outer tube 110 may comprise a polymer matrix composite. In various embodiments, composite outer tube 110 may comprise a polymer matrix composite reinforced by fibers such as a carbon, glass, organic fibers, or combinations thereof. In various embodiments, metallic inner tube may be comprised of a metallic material, such as steel, aluminum, or titanium, among others.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A structural component, comprising:
   a metallic inner tube;
   a first lobe extending from the metallic inner tube; a second lobe extending from the metallic inner tube, and
   a composite outer tube surrounding the metallic inner tube, the first lobe, and the second lobe;
   wherein a first end of the metallic inner tube extends from the composite outer tube and a second end of the metallic inner tube extends from the composite outer tube
   the metallic inner tube comprises a first constant diameter portion, a tapered portion, and a second constant diameter portion, an outer diameter of the first constant diameter portion is greater than an outer diameter of the second constant diameter portion;
   the second constant diameter portion is disposed axially inward from the tapered portion, and the tapered portion is disposed axially inward from the first constant diameter portion;
   the composite outer tube comprises a first wall thickness at the first constant diameter portion, the composite outer tube comprises a second wall thickness at the second constant diameter portion, and the first wall thickness is less than the second wall thickness; and
   the second constant diameter portion is disposed at a midpoint of the metallic inner tube.

2. The structural component of claim 1, wherein the metallic inner tube, the first lobe, and the composite outer tube are concentric.

3. The structural component of claim 2, wherein the first lobe mechanically locks the composite outer tube to the metallic inner tube.

4. The structural component of claim 1, wherein the first lobe is disposed at the first end of the metallic inner tube and the second lobe is disposed at the second end of the metallic inner tube.

5. The structural component of claim 1, wherein the metallic inner tube and the first lobe are comprised of a single piece of metal.

6. A hybrid metallic/composite arrangement, comprising:
   a metallic inner tube;
   a first lobe extending from the metallic inner tube;
   a second lobe extending from the metallic inner tube; and
   a composite outer tube surrounding the metallic inner tube, wherein an inner diameter surface of the composite outer tube conforms to an outer diameter surface of the metallic inner tube;
   wherein a first end of the metallic inner tube extends from the composite outer tube and a second end of the metallic inner tube extends from the composite outer tube;
   the metallic inner tube comprises a first constant diameter portion, a tapered portion, and a second constant diameter portion, an outer diameter of the first constant diameter portion is greater than an outer diameter of the second constant diameter portion;
   the second constant diameter portion is disposed axially inward from the tapered portion, and the tapered portion is disposed axially inward from the first constant diameter portion;
   the composite outer tube comprises a first wall thickness at the first constant diameter portion, the composite outer tube comprises a second wall thickness at the second constant diameter portion, and the first wall thickness is less than the second wall thickness; and
   the second constant diameter portion is disposed at a midpoint of the metallic inner tube.

7. The hybrid metallic/composite arrangement of claim 6, wherein the metallic inner tube, the first lobe, the second lobe, and the composite outer tube are concentric.

8. The hybrid metallic/composite arrangement of claim 7, wherein the first lobe and the second lobe mechanically lock the composite outer tube to the metallic inner tube.

9. The hybrid metallic/composite arrangement of claim 6, further comprising a third lobe and a fourth lobe extending from the metallic inner tube.

10. A method for forming a structural component, comprising:
    forming a metallic inner tube comprising at least one lobe; and
    disposing a composite layer about the metallic inner tube to form a composite outer tube;
    wherein the composite outer tube surrounds the metallic inner tube and the at least one lobe;
    the metallic inner tube comprises a first constant diameter portion, a tapered portion, and a second constant diameter portion, an outer diameter of the first constant diameter portion is greater than an outer diameter of the second constant diameter portion;

the second constant diameter portion is disposed axially inward from the tapered portion, and the tapered portion is disposed axially inward from the first constant diameter portion;

the composite outer tube comprises a first wall thickness at the first constant diameter portion, the composite outer tube comprises a second wall thickness at the second constant diameter portion, and the first wall thickness is less than the second wall thickness; and the second constant diameter portion is disposed at a midpoint of the metallic inner tube.

11. The method of claim 10, wherein the composite layer is disposed about the metallic inner tube using at least one of a composite layup process or a fiber-wound fabrication process, and the composite layer comprises a polymer matrix composite reinforced by fibers.

* * * * *